United States Patent [19]

McIntyre

[11] 4,056,037
[45] Nov. 1, 1977

[54] EXPANDING BOLT-LIKE FASTENING MEANS

[75] Inventor: Douglas Owen McIntyre, Royston, England

[73] Assignee: Dom Holdings Limited, Royston, England

[21] Appl. No.: 658,684

[22] Filed: Feb. 17, 1976

[30] Foreign Application Priority Data

Feb. 14, 1975 United Kingdom .................. 6362/75

[51] Int. Cl.² ............................................. F16B 13/04
[52] U.S. Cl. ...................................................... 85/74
[58] Field of Search ................... 85/67, 69, 73, 74, 75, 85/76, 77, 78, 79

[56] References Cited

U.S. PATENT DOCUMENTS

| 681,817 | 9/1901 | Smith | 85/75 |
|---|---|---|---|
| 1,311,038 | 7/1919 | Bowman | 85/79 X |
| 2,075,714 | 3/1937 | Hamill | 85/67 |
| 3,107,569 | 10/1963 | Lerick | 85/79 |
| 3,175,455 | 3/1965 | Reddy | 85/75 |
| 3,277,770 | 10/1966 | McCulloch | 85/77 X |
| 3,523,482 | 8/1970 | Ploch | 85/73 |
| 3,657,955 | 4/1972 | McKay | 85/73 X |
| 3,837,257 | 9/1974 | Fischer | 85/67 X |

FOREIGN PATENT DOCUMENTS

| 60,919 | 5/1943 | Denmark | 85/67 |
|---|---|---|---|
| 2,131,306 | 10/1972 | France. | |
| 263,925 | 7/1912 | Germany | 85/73 |
| 58,019 | 3/1914 | Switzerland. | |
| 1,321,479 | 6/1973 | United Kingdom | 85/79 |
| 1,285,699 | 8/1972 | United Kingdom | 85/67 |
| 389,752 | 3/1933 | United Kingdom | 85/67 |
| 576,813 | 4/1946 | United Kingdom | 85/77 |

*Primary Examiner*—Roy D. Frazier
*Assistant Examiner*—Thomas J. Holko
*Attorney, Agent, or Firm*—William F. Frank

[57] ABSTRACT

A bolt fastener of known kind for engagement in a socket is screwthreaded at its outer end, which protrudes for engagement with a nut. The fastener has a waisted portion, including a taper, towards the inner end of the fastener, the taper converging away from the inner end. The waisted portion is loosely surrounded by a collar with a slit along it. The collar grips the socket when the nut is tightened to withdraw the fastener relatively to the collar, the collar thereby being expanded by the taper. The present fastener is used wholly within the socket and, instead of being screwthreaded externally, has a bore which extends axially from the outer end and is screwthreaded for engagement with a headed bolt. The bore can be blind and not reach the waisted portion to avoid weakening it against tensile loading applied by the headed bolt; or be a through bore of stepped diameter and screwthreaded only beyond the waisted portion in the lesser diameter portion of the bore so that the fastener is subjected to axial compression when loaded by the bolt. A screwthreaded stud and nut can be used in place of the headed bolt.

4 Claims, 6 Drawing Figures

EXPANDING BOLT-LIKE FASTENING MEANS

This invention relates to expanding bolt-like fastening means.

Our United Kingdom Pat. No. 1,285,699 describes and claims a bolt fastener for attachment in a socket, the bolt having a thread on its outer end for engagement by a nut and having a waisted portion towards the inner end of the bolt comprising an axially tapered length, the taper being convergent in a direction away from said inner end and leading to a radially directed shoulder at that end of the waisted portion which is remote from said inner end, the waisted portion being loosely surrounded by a collar adapted for radial expansion into gripping contact with the socket when the waisted portion of the bolt is drawn axially relative to the collar, said collar being of unitary construction and provided with an axial slit extending along at least part of its length.

The present invention is a modification of or improvement in the bolt fastener according to U.K. Pat. No. 1,285,699, and comprises forming a bore which extends axially of the bolt from the extremity of the outer end, the bore being screwthreaded for reception of a correspondingly screwthreaded bolt or stud.

Examples of bolt fastener constructed in accordance with the present invention are described in the following, reference being made to the accompanying drawing, in which.

There is some correspondence between the first and second forms of bolt fastener and this is indicated by the use of corresponding reference numerals in the drawing.

Figure 1:
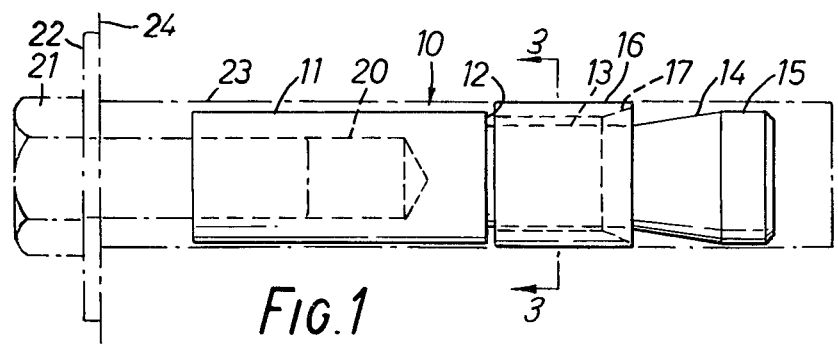
FIGS. 1 and 2 are longitudinal side views of a first form of the bolt fastener rotated 90° with respect to one another.
Figures 2, 3:
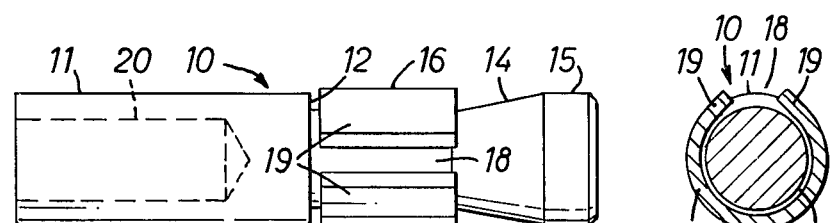
FIG. 3 is an end-sectional view on the line 3—3 of FIG. 1.
Figure 6:
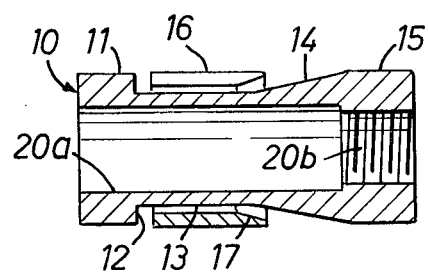
FIG. 6 is a longitudinal section on the line 6—6 of FIG. 5, showing only the bolt fastener.

Referring to FIGS. 1 to 3, the first bolt fastener comprises a bolt 10 having a plain cylindrical surface portion 11 extending from an outer end on the left of FIGS. 1 and 2 to a shoulder 12 which is substantially at right angles to the shank. From the shoulder 12 to the inner end of the bolt there are, in succession, a waisted portion which, as can be seen in FIGS. 1 and 6, comprises a cylindrical, portion 13 a divergent conical portion 14 of about 16° included angle, and which terminates in end portion 15 of the full diameter of the bolt.

Surrounding the waisted portion is a unitary (i.e. one-piece) collar 16. The collar 16 is loose on the portion and its outer diameter is somewhat greater than the full diameter of the bolt 10. The left hand end of the collar 16 is radial to the collar axis whereas the right hand end has an internal surface consisting substantially of an internal bevel 17, but the bevel is not essential. The collar is furthermore gapped at 18 from end to end. The gap 18 in the collar is formed by the edges of the marginal portions 19, these portions 19 lying tangentially of the remainder of the section of the collar, as can be seen in FIG. 3.

Figures 4, 5:
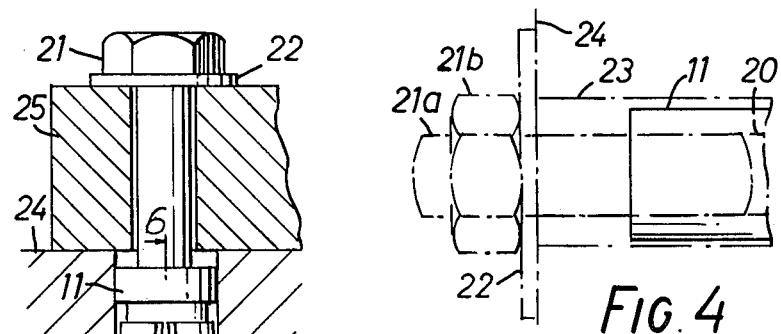
FIG. 4 is a fragmentary side view of the fastener, indicating the application of a stud and nut thereto.
FIG. 5 is a longitudinal side view of a second form of the bolt fastener, showing its application.

The outer end of the bolt is formed with a screwthreaded blind bore 20. The bore 20 terminates in the full diameter outer portion of the bolt and is for reception of a correspondingly screwthreaded member, which can be a headed bolt 21 as shown in FIG. 1, or a stud 21a having a nut 21b threaded on it as indicated in FIG. 4. A washer 22 is shown under the bolt head or the nut, the outer diameter of the washer exceeding the full diameter of the bolt 10.

In use, the bolt 10 is inserted in a socket 23 in, for example, masonry, to a depth such that the outer end of the bolt 10 is below the masonry surface 24 surrounding the socket to an extent adequate for the fastening operation. Fastening is effected by drawing the washer 22 up against the masonry surface 24 by means of the headed bolt 21 (or stud 21a and nut 21b) so that the fastener bolt 10 is subjected to withdrawal relative to the collar 16, which is held by friction in the socket 23. Continued withdrawal of the fastener bolt 10 relative to the collar 16 causes the latter to engage and be expanded by the divergent portion 14 of the bolt 10 into firm engagement with the socket 23, anchoring of the bolt 10 against further withdrawal resulting.

The bolt 21 or, correspondingly, the stud 21a and nut 21b, and preferably the washer 22, may be employed for anchoring, i.e. setting the bolt fastener 10 in the socket 23, the bolt fastener remaining set even after unthreading of the bolt 21, so that the bolt fastener can serve as a screwthreaded socket in the masonry. Alternatively, the bolt 21 or stud 21a and nut 21b may be employed both to set the bolt fastener 10 in the socket 23 and for securing a structural element to the masonry, the element being apertured for reception of the shank of the bolt 21 or stud, and clamped under the bolt head or nut against the masonry.

It will be appreciated that the bolt fastener 10 just described is subjected to tension over the waisted portion when securing the element. In the second form of bolt fastener, which is shown in FIGS. 5 and 6, the waisted portion is not subjected to tension when the bolt fastener is being set, or subsequently, the inner end of the fastener being subject to axial compression as hereinafter described.

The bore in FIG. 5 is open at each end, is of stepped diameter, and consists of a plain bore 20a, which extends from the outer end of the bolt fastener to approximately the region where the divergent portion 14 meets the terminal portion 15, and of a screwthreaded bore 20b of root diameter less than the diameter of the plan bore 20a.

Because the screwthreaded portion 20b is formed in portion 15, the surface 11 in FIGS. 5 and 6 can (as shown) be shorter, in the axial sense, than the counterpart in FIGS. 1 and 2.

In use, the bolt 10 of FIG. 5 is inserted and set in a socket 23 as shown in FIG. 4 in a manner corresponding to the bolt 10 in FIG. 2. The shank of the headed bolt 21 or of a stud which is used with a nut, employed in FIG. 4 is, however, of less outside diameter than the bore 20a into which it is introduced, but makes screwthread engagement with the bore 20b.

During the setting operation by the bolt 21, the bolt fastener 10 tends to be withdrawn from the socket 23 by the action of the bolt 21 but is held as the collar 16 becomes expanded by reaction against the divergent portion 14 of the fastener and itself becomes held firmly between the portion 14 and the socket 23. Tension imposed on the bolt 21 during the setting operation applies a corresponding axial compression on the inner end of the fastener through the screwthread engagement between the bolt 21 and the bore 20b, a corresponding reaction being engendered between the divergent portion 14 and the collar 16 on the one hand, and between the collar 16 and the socket 23 on the other hand.

Fig. 5 shows a structural element 25 clamped between the surface 24 of masonry in which the socket 23 is formed, and a washer 22 under the head of the bolt 21, the bolt fastener 10 thereby being under axial compression.

It will be appreciated that, because the screwthreaded bore 20b is located at the inner end of the fastener bolt 10, the bolt 10 in FIG. 6 can be shorter than a fastener bolt constructed as in FIG. 2 and having at the outer end a screwthreaded bore 20 equivalent to the bore 20b, FIG. 6, and can be accommodated in a shallower socket 23. Moreover, because the bolt 10, FIG. 6, is not subjected to tension after the setting operation, it is stronger in use than a bolt 10 constructed as in FIG. 2 to engage the equivalent of bolt 21, FIG. 2.

The collar 16 shown in the drawing has an end to end slit but there could be additional slits distributed to extend from the relieved end of the collar, the collar nonetheless also being a one-piece construction and of an inner diameter which, before expansion, is less than the greatest diameter of the conical or taper portion 14 so that the collar 16 is retained loosely between the shoulder 12 and the inner end of the fastener 10.

What I claim is:

1. Bolt fastener means for locking engagement in a socket comprising an elongated cylinder-like member with a bore and a collar element loosely fitted on said member; said member comprising an inner end portion and an outer end portion of equal diameter and a waisted portion formed between said inner end portion and said outer end portion, the waisted portion further comprising a cylindrical portion of lesser diameter than said end portions and an abutting, axially-extending conical portion, the cylindrical portion extending from a radially directed shoulder formed on said outer end portion, the conical portion being convergent in a direction away from said inner end portion and leading to the cylindrical portion; said collar element being of one piece and retained loosely on said waisted portion of the fastener between said shoulder and said inner end portion of the fastener and adapted for radial expansion into engagement with the socket by having at least one slit therein which extends axially from that end of the collar which is adjacent to the said conical portion, the collar further having an inner diameter which, before the radial expansion, is less than the greatest diameter of the conical portion; said bore being of stepped diameter and extending axially throughout the length of the fastener, said stepped bore consisting of a plain bore and of a screw threaded bore of less root diameter than the diameter of the plain bore, the screw threaded bore extending through the inner end portion of the fastener and the plain bore extending through the outer end portion and the waisted portion of the fastener to the region where the conical portion meets the inner end portion.

2. In combination, bolt fastener means for locking engagement in a socket and a screw threaded means for engaging said fastener means and setting same in the socket, the fastener means comprising an elongated cylinder-like member with a bore and a collar element loosely fitted on said member; said member comprising an inner end portion and an outer end portion of equal diameters and a waisted portion formed between said inner end portion and said outer end portion, the waisted portion further comprising a cylindrical portion of lesser diameter than said end portions and an abutting, axially-extending conical portion, the cylindrical portion extending from a radially directed shoulder formed on said outer end portion, the conical portion being convergent in a direction away from said inner end portion and leading to the cylindrical portion; said bore being of stepped diameter and extending axially throughout the length of the fastener, said stepped bore comprising a plain bore and of a screw threaded bore of less root diameter than the diameter of the plain bore, the screw threaded bore extending through the inner end portion of the fastener and the plain bore extending through the outer end portion and the waisted portion of the fastener to the region where the conical portion meets the inner end portion; said collar element being of one piece and retained loosely on said waisted portion of the fastener between the shoulder and said inner end portion of the fastener and adapted for radially expansion into engagement with the socket by having at the end of the collar which is adjacent to said inner end portion of the fastener at least one slit therein which extends axially from that end of the collar which is adjacent to the conical portion toward the outer end portion of the fastener, the collar further having an inner diameter which, before the radial expansion, is less then the greatest diameter of the conical portion; the screw threaded means for engaging and setting the fastener extending through the plain bore and into the screw threaded bore in the inner end portion and making screw thread engagement therewith, the screw threaded means being under tension during the withdrawing movement of the fastener in relation to the collar and setting of the fastener in the socket, the tension in the bolt applying axial compression to the waisted portion of the fastener as the conical portion is drawn into the collar which is expanded against the socket into locking engagement therewith.

3. The combination according to claim 2 wherein said screw threaded means comprises a screw threaded bolt having a head integral therewith.

4. The combination according to claim 3 wherein the screw threaded means comprises a screw threaded stud with complimenting nut.

* * * * *